US007606152B2

(12) United States Patent
Hurtta

(10) Patent No.: US 7,606,152 B2
(45) Date of Patent: *Oct. 20, 2009

(54) SETTING A COMMUNICATION CHANNEL

(75) Inventor: Tuija Hurtta, Espoo (FI)

(73) Assignee: Nokia Corporation, Espoo (FI)

( * ) Notice: Subject to any disclaimer, the term of this patent is extended or adjusted under 35 U.S.C. 154(b) by 0 days.

This patent is subject to a terminal disclaimer.

(21) Appl. No.: 11/932,262

(22) Filed: Oct. 31, 2007

(65) Prior Publication Data

US 2008/0117870 A1 May 22, 2008

Related U.S. Application Data

(63) Continuation of application No. 09/792,057, filed on Dec. 26, 2001, now Pat. No. 7,298,697, which is a continuation-in-part of application No. 09/546,207, filed on Apr. 10, 2000, now abandoned.

(51) Int. Cl.
*H04L 1/00* (2006.01)
(52) U.S. Cl. ............... 370/230; 370/235; 370/328
(58) Field of Classification Search ............... None
See application file for complete search history.

(56) References Cited

U.S. PATENT DOCUMENTS

| | | | |
|---|---|---|---|
| 5,388,147 A | 2/1995 | Grimes | 455/404.2 |
| 5,396,543 A | 3/1995 | Beeson et al. | |
| 5,890,061 A | 3/1999 | Timm et al. | |
| 5,898,736 A | 4/1999 | Saito et al. | |
| 6,061,346 A | 5/2000 | Nordman | |
| 6,256,509 B1 | 7/2001 | Tanaka et al. | |
| 6,314,300 B1 | 11/2001 | Nakashima et al. | |
| 6,317,421 B1 | 11/2001 | Wilhelmsson et al. | |
| 6,373,829 B1 | 4/2002 | Vilmur | |
| 6,415,151 B1 | 7/2002 | Kreppel | |
| 6,418,128 B1 | 7/2002 | Takagi et al. | |
| 6,463,055 B1 | 10/2002 | Lupien et al. | |
| 6,480,717 B1 | 11/2002 | Ramaswamy | |
| 6,496,694 B1 | 12/2002 | Menon et al. | |
| 6,504,832 B1 | 1/2003 | Koo et al. | |
| 6,532,225 B1 | 3/2003 | Chang et al. | |
| 6,590,905 B1 | 7/2003 | Suumaki et al. | |
| 6,594,241 B1 | 7/2003 | Malmlof | |
| 6,621,793 B2 * | 9/2003 | Widegren et al. | 370/230.1 |

(Continued)

FOREIGN PATENT DOCUMENTS

DE 19748231 5/1999

(Continued)

OTHER PUBLICATIONS

Computer Dictionary, Microsoft Press, 1997, p. 52.

(Continued)

*Primary Examiner*—Frank Duong
(74) *Attorney, Agent, or Firm*—Banner & Witcoff, Ltd.

(57) ABSTRACT

In a packet switched wireless communications network, a parameter of a communication channel request indicates that the communication channel is to be used to transfer call related control messages. Upon receipt of the communication channel request, a network element sends a request to a radio access network that a part of the communication channel should be setup to transfer call related control messages. Another network element sets filtering information to allow only specific messages to be transferred on the communication channel. Specifically, the filtering information is set such that only call related control messages may be transferred on the communication channel. The other network element then sends the filtering information to the user equipment (UE). The UE derives the uplink filtering information from the received filtering information.

19 Claims, 2 Drawing Sheets

U.S. PATENT DOCUMENTS

| | | |
|---|---|---|
| 6,621,809 B1 | 9/2003 | Lee et al. |
| 6,625,127 B1 | 9/2003 | Klas et al. |
| 6,654,610 B1 | 11/2003 | Chen et al. |
| 6,677,894 B2 | 1/2004 | Sheynblat et al. ........ 342/357.1 |
| 6,703,971 B2 | 3/2004 | Pande et al. ............ 342/357.09 |
| 6,707,813 B1 | 3/2004 | Hasan et al. |
| 6,708,034 B1 | 3/2004 | Sen et al. |
| 6,728,208 B1 | 4/2004 | Puuskari |
| 6,728,365 B1 | 4/2004 | Li et al. |
| 6,741,863 B1 | 5/2004 | Chiang et al. ............ 455/456.1 |
| 6,771,637 B1 | 8/2004 | Suzuki et al. |
| 6,819,929 B2 | 11/2004 | Antonucci et al. .......... 455/455 |
| 6,888,821 B2 | 5/2005 | Rasanen et al. |
| 2001/0027490 A1 | 10/2001 | Fodor et al. |
| 2004/0002348 A1 | 1/2004 | Fraccaroli ................ 455/456.3 |
| 2004/0033795 A1 | 2/2004 | Walsh et al. ............. 455/404.1 |

FOREIGN PATENT DOCUMENTS

| | | |
|---|---|---|
| EP | 0789498 | 8/1997 |
| WO | WO 99/05828 | 2/1999 |
| WO | WO 02/069663 | 9/2002 |

OTHER PUBLICATIONS

Karagiannis, QoS in GPRS, pp. 1-87, Dec. 2000.
Office Action dated Dec. 15, 2006 in U.S. Appl. No. 09/709,716.
Office Action dated Sep. 3, 2008 in U.S. Appl. No. 09/709,716.

* cited by examiner

SETTING A COMMUNICATION CHANNEL

This application is a continuation of U.S. patent application Ser. No. 09/792,057, filed on Dec. 26, 2001 now U.S. Pat. No. 7,298,697, which is a continuation-in-part of U.S. patent application Ser. No. 09/546,207, filed on Apr. 10, 2000 now abandoned are hereby incorporated by reference in its entirety.

BACKGROUND

1. Field of the Invention

This invention relates generally to methods and systems providing telephony communications through a packet switched wireless network. A particular aspect of the invention relates to methods of transferring call related control messages in a packet switched wireless network.

2. Description of the Related Art

In general, packet switched wireless networks provide communications for mobile terminals with no physical connection required for network access. The General Packet Radio Service (GPRS) in the Global System for Mobile Communications (GSM) and the Universal Mobile Terrestrial System (UMTS) have both been developed to provide wireless communications networks with a packet switched side as well as a circuit switched side.

The specifications for a UMTS network with further improvements have been released by the $3^{rd}$ Generation Partnership Project (www.3gpp.org). Release 99 of the UMTS specifications provides that a network subscriber can have one or more packet data protocol (PDP) addresses. Each PDP address is described by one or more PDP contexts in the Mobile Station (MS), the Service GPRS Service Node (SGSN), and the Gateway GPRS Service Node (GGSN). A GGSN is a gateway to an external network. Each PDP context may have forwarding and mapping information for directing the transfer of data to and from its associated PDP address and a traffic flow template (TFT) for filtering the transferred data.

Each PDP context can be selectively and independently activated, modified and deactivated. The activation state of a PDP context indicates whether or not data transfer is enabled for a corresponding PDP address and TFT. If all PDP contexts associated with the same PDP address are inactive or deactivated, then all data transfer for that PDP address is disabled. All PDP contexts of a subscriber are associated with the same Mobility Management (MM) context for the International Mobile Subscriber Identity (IMSI) of that subscriber.

An example of the PDP context activation procedure in Release 99 of the UMTS specifications is shown in FIG. 2. As known from the specifications, the PDP context activation procedure is slightly different depending on whether it is the first PDP context activation procedure for a particular PDP address or a subsequent PDP context activation procedure (called "secondary" PDP contexts).

The activate PDP context request message sent in step 1 of FIG. 2 includes a number of parameters. The parameters include a PDP address and an Access Point Name (APN). The PDP address is used to indicate whether a static PDP or dynamic PDP address is required. The APN is a logical name referring to the Gateway GPSR Support Node (GGSN) to be used. In step 3, the SGSN sends a Radio Access Bearer (RAB) setup message to the UMTS Terrestrial Radio Access Network (UTRAN). In step 4, the SGSN sends a Create PDP Context Request message to the affected GGSN. The GGSN decides whether to accept or reject the request, If it accepts the request, it modifies its PDP context table and returns a Create PDP Context Response message. The SGSN then sends an Activate PDP Context Accept message to the User Equipment (UE) in step 5.

Despite the detailed specifications provided for packet routing and PDP context in Release 99 of UMTS, it does not provide for certain telephone calls which may need to be handled in a particular manner. For example, emergency 911 calls are to be routed to a public safety answering point (PSAP) without cost to the calling party even if the calling party is roaming beyond their home area. Because of their packet oriented nature, UMTS and other recently developed packet switched wireless communications networks have problems identifying such types of calls and treating them appropriately while simultaneously guarding against abuse or fraud.

BRIEF SUMMARY OF THE EXAMPLE EMBODIMENTS

The present invention addresses packet switched wireless communications networks which are disadvantageous for at least the above reasons. In particular, one of the key problems solved by the invention is the transfer of call related control messages. The invention provides a method of setting a communication channel in order to transfer call related control messages.

More particularly, the example embodiments of the invention described in detail below are an efficient way to reuse or adapt the PDP context activation and the secondary PDP context activation procedure in UMTS and other networks for signalling to transfer call related control messages rather than for transferring data packets. The resulting "signalling PDP context" is preferably used to transfer call related control messages and specifically call control messages. It also makes it possible, but does not require, that the call related control messages can be transferred free of charge.

In exemplary, non-limiting, embodiments of the invention, the access point name (APN) parameter of a packet data protocol (PDP) context request is used for transferring call related control messages. A serving GPRS service node (SGSN) informs a Radio Access Network (RAN) that a Radio Access Bearer (RAB) for the signalling PDP context should be setup. The SGSN indicates in the RAB setup request message that call related control messages will be transferred on the RAB. According to the indication, a radio bearer for the signalling PDP context in the RAN can be allocated. If the option of transferring the call related control messages free of charge is elected, then the SGSN sets the charging characteristics of the PDP context accordingly. A gateway GPRS service node (GGSN) sets a Traffic Flow Template (TFT) to allow only specific messages to be transferred on the PDP context. Specifically, the TFT is set such that only call related control messages may be transferred on the PDP context. TFT thus acts as filtering information. The GGSN then sends the TFT to the SGSN and the SGSN forwards the TFT to the User Equipment (UE). The UE derives the uplink TFT from the received TFT. This improves the security so that only predefined messages can be sent by the UE.

Another embodiment is to allow the UE to set the filtering information, for example the TFT, so that only call related control messages can be sent on the PDP context. Since UE is not a trusted element, there is a possibility that the UE sets unauthorized filtering information, for example TFT, and there is thus a possibility of fraud. In this embodiment, the GGSN has to validate the filtering information, for example the TFT.

BRIEF DESCRIPTION OF THE DRAWINGS

The foregoing and a better understanding of the present invention will become apparent from the following detailed description of example embodiments and the claims when read in connection with the accompanying drawings, all forming a part of the disclosure of the invention. While the foregoing and following written and illustrated disclosure focuses on disclosing example embodiments of the invention, it should be clearly understood that the same is by way of illustration and example only and is not to be taken by way of limitation, the spirit and scope of the present invention being limited only by the terms of the claims in the patent issuing from this application.

DETAILED DESCRIPTION

The exemplary embodiments of the present invention seek to provide a method of activating a signaling PDP context to transfer call related control messages in a packet switched wireless communications network. These exemplary embodiments of the invention can be utilized in a large number and variety of application level operations since such application level operations will typically require a signalling PDP context. The present invention of course is not limited to these exemplary embodiments. It is more broadly directed to various methods of activating a signalling PDP context as indicated by the appended claims.

Figure 1:
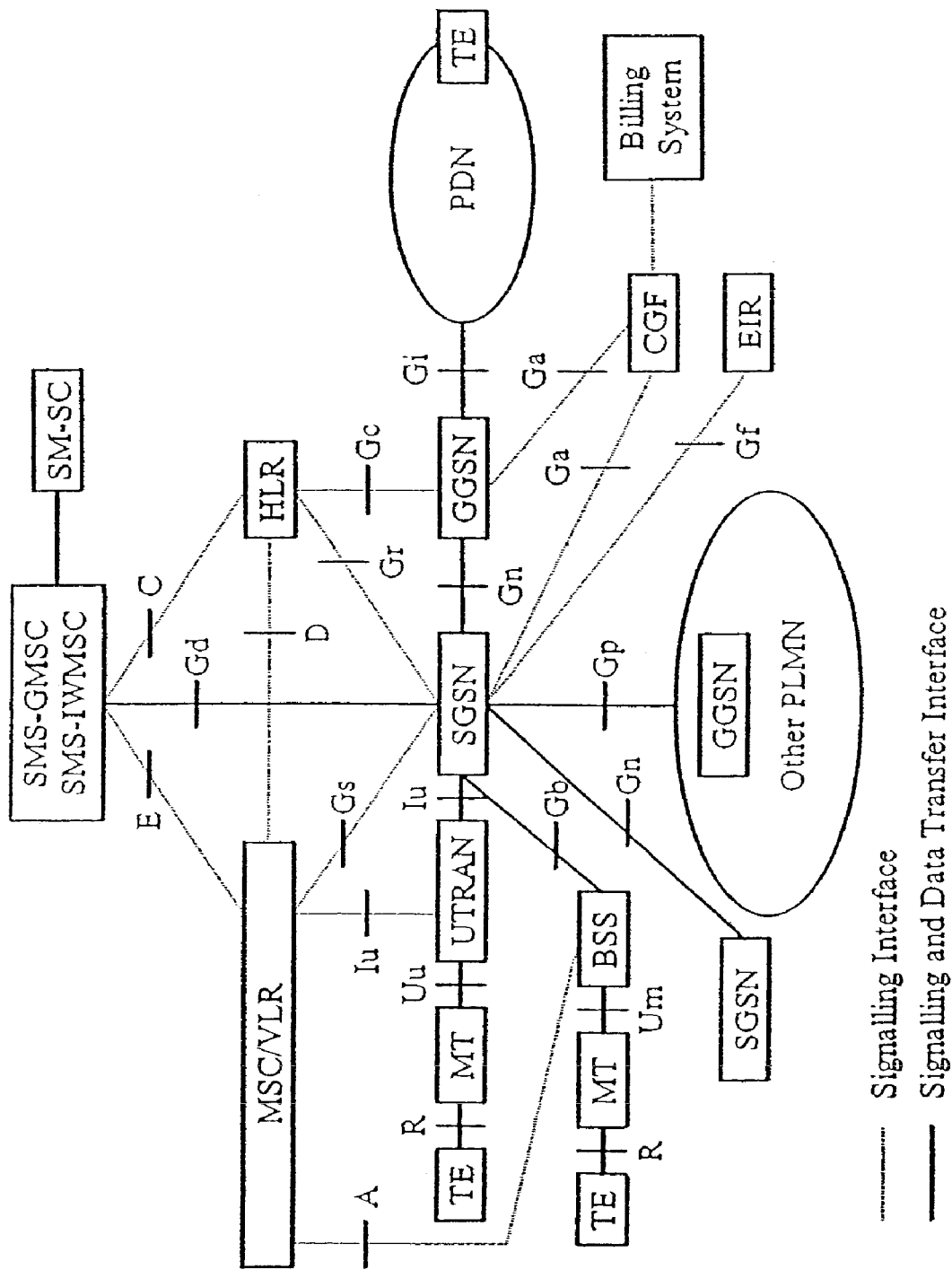
FIG. 1 is a generalized block diagram of the architecture of a packet switched wireless communications network in which the example embodiments of the invention may be practiced.

An example of a network architecture supporting these specifications is the wireless communications network shown in the block diagram of FIG. 1. The various elements of the network and their functions may, but need not, be those described in the General Packet Radio Service (GPRS) Service Description, Stage 2, 3G TS-23.060, Version 3.2.1, published by the 3$^{rd}$ Generation Partnership Project (www.3gpp.org) and which is hereby incorporated by reference. The elements and their functions may instead be those described in an earlier or later version of the 3G TS 23.060 specifications or may be those of any other known packet switched wireless communications network. The description of network elements and their functions hereby incorporated by reference is merely a non-limiting example of packet switched wireless communication networks.

Several elements of the example network illustrated in FIG. 1 are particularly relevant to this invention. The Mobile Terminal (MT), commonly referred to as a cell phone or mobile phone, is only one possible part of User Equipment (UE). Typically, Terminal Equipment (CTE) used together with a Mobile Terminal (MT) constitutes User Equipment (UE). Any UE may be utilized in conjunction with this invention so that it operates or can be programmed to operate in the manner described below. The UMTS Terrestrial Radio Access Network (UTRAN), and the Base Station System (BSS) in GPRS, manage and control the radio access between the network and a number of UEs.

The Serving GPRS Support Node (SGSN) is the node that serves the UE. At PDP Context Activation, the SGSN establishes a PDF context used for data forwarding purposes. The Gateway GPRS Support Node (GGSN) is the node accessed by the packet data network due to evaluation of the PDP address. It contains routing information for attached GPRS users. The routing information is used to tunnel Protocol Data Units (PDUs) to the SGSN. The SGSN and GGSN functionalities or they may reside in different physical nodes or they may be combined in the same physical node, for example, an Internet GPRS Support Node (IGSN).

Figure 3:
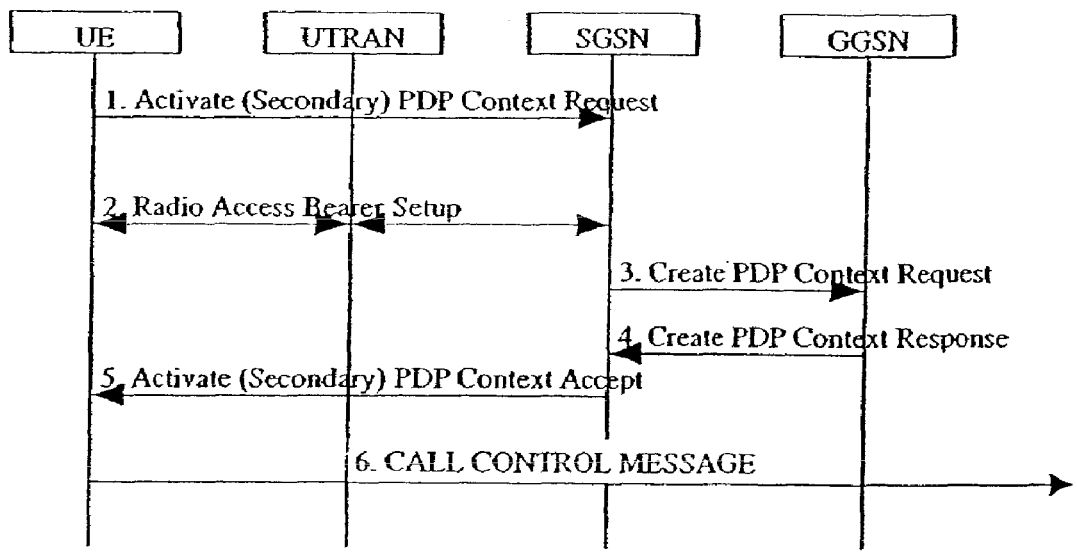
FIG. 3 is a generalized signalling flow diagram illustrating the example embodiments of the invention transferring call related control messages.

FIG. 3 shows a signalling flow diagram illustrating the example embodiments of the invention activating a signaling PDP context to transfer call related control messages between User Equipment (UE), the UMTS Terrestrial Radio Access Network (UTRAN), Serving GPRS Support Node (SGSN), and Gateway GPRS Support Node (GGSN). The embodiments may utilize either the initial PDP context activation procedure for a particular PDP address or a subsequent (secondary) PDP context activation procedure for the PDP address. Although there are some similarities, the initial PDP context activation procedure and the secondary PDP context activation procedure differ from each other. Furthermore, the signalling PDP context can be activated in advance (i.e., before it is known whether there are any call related control messages to be transferred). In these example embodiments, the activated PDP context is used specifically and exclusively to transfer call related control messages.

Figure 2:
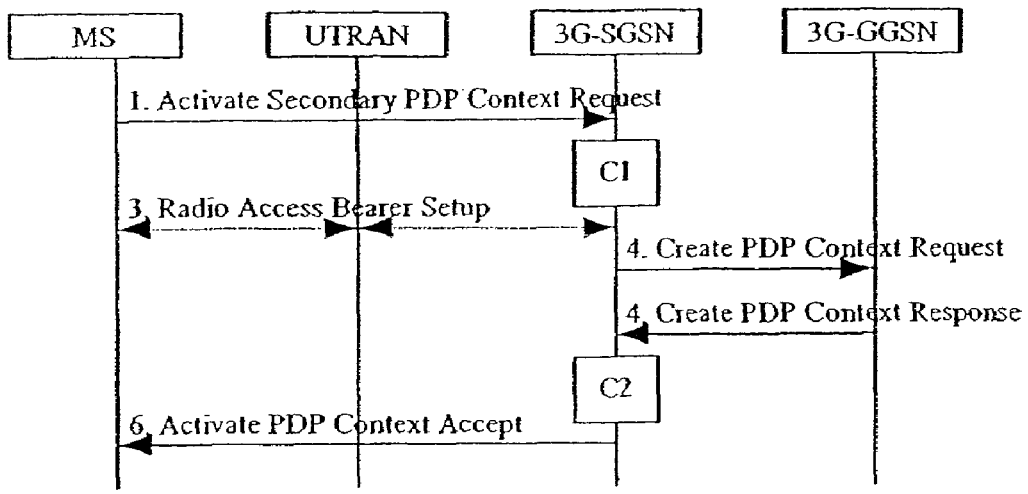
FIG. 2 is a generalized signalling flow diagram illustrating an example PDP context activation procedure.

At step 1 of FIG. 3, the User Equipment (preferably including a mobile terminal) initiates a request to activate a primary or a secondary PDP context for signalling. The activation request may or may not be the result of actions taken by the user or other events occurring at the application of the user equipment (UE). The activation request may also be initiated by other elements of the network. However, step 1 of FIG. 3 differs from the activate PDP context request in FIG. 2 insofar as it requests a PDP context for transferring call related control messages and does not request a PDP context used for transferring packet data. It also differs insofar as the APN provides the indication that the PDP context is a signalling PDP context and is not used in its conventional manner as a parameter which is a logical name referring to the GGSN to be used. According to a further embodiment, the UE may set the filtering information, for example TFT, for the PDP context.

At step 2, the Service GPRS Service Node (SGSN) sends the information that the PDP context is a signalling PDP context to a Radio Access Network (RAN), preferably the UMTS Terrestial Radio Access Network (UTRAN). The UTRAN manages a number of channels for communication with the UE and sets up a radio access bearer (RAB) for the PDF context which will be used to transfer call related control messages. The example embodiments shown in FIG. 3 differ from the conventional PDP context activation procedures at least insofar as the SGSN informs the UTRAN that the PDP context is a signaling PDP context.

At step 3, the SGSN sends a Create PDP Context Request, including the special APN indicating that the PDP context is a signaling PDP context, to the Gateway GPRS Service Node (GGSN). In one example embodiment, the SGSN sets the charging characteristics of the PDP context as "free of charge" if it is desired that transferring of call related control messages will not be charged by the network Billing System.

In response to step 3, GGSN sometimes sets a Traffic Flow Template (TFT) for the requested signalling PDP context. In an example embodiment where the call related control messages will not be charged, the GGSN sets the Traffic Flow Template (TFT) of the PDP context such that only call related control messages are accepted to be transferred on the PDP context. This TFT is set such that only call related control messages may be transferred on the PDP context and is used to filter downlink packets in the GGSN. In the GGSN setting the TFT is optional. It ensures that only data packets according to the TFT are allowed to be transferred on the requested PDP context and prevents transferring other data on the PDP context free of charge. This embodiment also differs from the conventional PDP context activation procedure in which the UE sets the TFT. However, in a further embodiment of the invention, in which the TFT is set by the UE for the PDP context, the GGSN has to validate the TFT set by the UE. The GGSN then monitors, if the TFT set by the UE is in accordance with the criteria that only call control related messages are allowed to be transferred on that particular PDP context. The GGSN thus monitors data over the PDP context. In case of detecting an unauthorized data transmission over the communication channel, the GGSN blocks the data from transfer over said communication channel.

In step 4, the GGSN acknowledges the request and sends the TFT to the SGSN in a Create PDP Context Response message. The GGSN may include the address of an entity handling calls to the Create PDP Context Response message. Of course, in a network having an IGSN instead of a GGSN and a SGSN, the IGSN carries out steps 3, 4 and 5.

In step 5, the SGSN acknowledges the Activate (Secondary) PDP Context Request message and copies the TFT and the address of the entity handling calls to the UE in an Activate (Secondary) PDP Context Accept message. The UE then derives the uplink TFT from the received TFT.

Step 6 shows the end result of the example embodiments: that call related control messages can be easily sent by the UE on the created PDP context.

While the foregoing has described what are considered to be example embodiments of the invention, it is understood that various modifications may be made therein and that the invention may be implemented in various forms and embodiments, and that it may be applied in numerous applications, only some of which have been described herein. It is intended by the following claims to claim all such modifications and variations.

The invention claimed is:

1. An apparatus comprising:
a first network element configured to generate a request to setup a communication channel and including in said request a parameter indicating that the communication channel will be used for transferring call related control messages to or from said first network element and to communicate the request to a second network element, said second network element receiving from said first network element, said request to setup a communication channel having an indication indicating that the communication channel will be used for transferring call related control messages to or from said first network element,
at least one of said first or second network element setting filtering information for said communication channel in response to receiving said request to set up said communication channel; and
at least one of said first network element and said second network element filtering messages transferred on said communication channel according to said filtering information set in response to receiving said parameter.

2. An apparatus as recited in claim 1, wherein said first network element is a user equipment and said second network element is a gateway GPRS support node (GGSN).

3. An apparatus as recited in claim 1, wherein said second network element is configured to send a request to setup part of the communication channel to a radio access network, said request including the parameter indicating that the communication channel will be used for transferring call related control messages.

4. An apparatus comprising:
a first network element programmed to:
generate a request to setup a communication channel;
include in the request, a parameter which indicates that said communication channel will be used for transferring call related control messages to or from said first network element and that filtering information should be set in response to said request; and
send, to another network element in a packet switched wireless communications network, said request to setup said communication channel, said request having the parameter indicating that the communication channel will be used for transferring call related control messages to or from said first network element and that filtering information should be set in response to said request.

5. The apparatus recited in claim 4, wherein the first network element is configured to set said filtering information.

6. The apparatus recited in claim 4, wherein the network element is configured to filter uplink data traffic using said filtering information.

7. The apparatus recited in claim 4, wherein said filtering information is a Traffic Flow Template (TFT).

8. The apparatus recited in claim 4, wherein said communication channel is a Packet Data Protocol (PDP) context and the request to set up a communication channel comprises an Activate Secondary Packet Data Protocol (PDP) Context Request or an Activate Packet Data Protocol (PDP) Context Request.

9. The apparatus recited in claim 4, wherein the another network element is a serving GPRS support node (SGSN) or a gateway GPRS support node (GGSN).

10. The apparatus recited in claim 4, wherein the another network element is configured to set said filtering information.

11. An apparatus comprising:
a first network element programmed to:
receive, from another network element in a packet switched wireless communications network, a request to setup a communication channel, said request including a parameter, said parameter indicating that the communication channel will be used for transferring call control messages;
set filtering information for said communication channel in response to receiving the parameter from the request to set up a communication channel for call related control messages;
monitor data sent on said communication channel based on said filtering information; and
block the data from transfer in said communication channel if the data is not call related control messages.

12. The apparatus of claim 11, wherein said another network element is a user equipment or a serving GPRS support node (SGSN).

13. The apparatus recited in claim 11, wherein said filtering information is a Traffic Flow Template (TFT).

14. The apparatus recited in claim 11, wherein said communication channel is a Packet Data Protocol (PDP) context and the request to set up a communication channel comprises a Create Packet Data Protocol (PDP) Context Request.

15. The apparatus recited in claim 11, wherein the apparatus is a gateway GPRS support node (GGSN).

16. A method comprising:

generating, at a first network element, a request to setup a communication channel;

including in the request, a parameter which indicates that said communication channel will be used for transferring call related control messages to or from the first network element and that filtering information should be set in response to said request; and sending, to another network element in a packet switched wireless communications network, said request to setup said communication channel, said request having the parameter indicating that the communication channel will be used for transferring call related control messages to or from the first network element and that filtering information should be set in response to said request.

17. The method recited in claim 16, further comprising filtering uplink data traffic using said filtering information.

18. A method comprising:

receiving, from another network element in a packet switched wireless communications network, a request to setup a communication channel, said request including a parameter, said parameter indicating that the communication channel will be used for transferring call control messages;

setting filtering information for said communication channel in response to receiving the parameter from the request to set up a communication channel for call related control messages;

monitoring data sent on said communication channel based on said filtering information; and blocking the data from transfer in said communication channel if the data is not call related control messages.

19. The method as recited in claim 18, wherein said communication channel is a Packet Data Protocol (PDP) context and the request to set up a communication channel comprises a Create Packet Data Protocol (PDP) Context Request.

* * * * *